United States Patent [19]

Yamazaki et al.

[11] Patent Number: 4,758,486

[45] Date of Patent: Jul. 19, 1988

[54] ENDLESS BELT SHAPED ELECTROPHOTOGRAPHIC PHOTOCONDUCTOR

[75] Inventors: Junichi Yamazaki, Mishima; Atsushi Kutami, Numazu, both of Japan

[73] Assignee: Ricoh Company, Ltd., Tokyo, Japan

[21] Appl. No.: 726,620

[22] Filed: Apr. 24, 1985

[30] Foreign Application Priority Data

Apr. 24, 1984 [JP] Japan ................................. 59-82267
Apr. 24, 1984 [JP] Japan ................................. 59-82268

[51] Int. Cl.$^4$ ............................................. G03G 5/10
[52] U.S. Cl. ........................................ 430/56; 430/62; 430/63; 430/69; 430/127; 428/61; 355/3 BE; 355/16; 252/511; 252/514
[58] Field of Search ................. 428/61; 430/56, 127, 430/66, 62, 63, 69; 252/514; 355/16, 3 BE

[56] References Cited

U.S. PATENT DOCUMENTS

| | | | |
|---|---|---|---|
| 3,235,772 | 2/1966 | Gurin | 252/514 X |
| 3,359,145 | 12/1967 | Solzer et al. | 252/511 X |
| 3,984,241 | 10/1986 | Schrempp et al. | 430/127 |
| 4,113,981 | 9/1978 | Fujita et al. | 252/511 X |
| 4,127,699 | 11/1978 | Aumiller et al. | 252/511 X |
| 4,389,340 | 6/1982 | Levy | 252/511 X |

OTHER PUBLICATIONS

Jenkins, Polymer Science, vol. 1, pp. 245–247, (1972).

Primary Examiner—J. David Welsh
Attorney, Agent, or Firm—Oblon, Fisher, Spivak, McClelland & Maier

[57] ABSTRACT

An endless belt shaped electrophotographic photoconductor is disclosed, which comprises an electroconductive support material, a photoconductive layer formed thereon, a joint portion by which the electrophotographic photoconductor is worked into the shape of an endless belt, and a grounding electrode which is electrically connected to the electroconductive support material, the joint portion comprising an electroconductive overcoating layer by which the photoconductive layer in the joint portion is covered, the electroconductive overcoating layer comprising a polymeric material having a glass transition of −10° C. or lower and finely-divided electroconductive particles, or the joint portion further comprising a joint reinforcement resin layer which is formed so as to be inserted between the electroconductive overcoating layer and the photoconductive layer in the joint portion.

5 Claims, 1 Drawing Sheet

ENDLESS BELT SHAPED ELECTROPHOTOGRAPHIC PHOTOCONDUCTOR

BACKGROUND OF THE INVENTION

The present invention relates to an endless belt shaped electrophotographic photoconductor comprising an electroconductive support material and a photoconductive layer formed thereon, having a joint portion for combining the opposite end portions thereof in such a manner that the photoconductor is worked into an endless belt form, which joint portion comprises an electroconductive overcoating layer formed on the photoconductive layer, or additionally with a joint reinforcement resin layer inserted between the electroconductive overcoating layer and the photoconductive layer in the joint portion.

Conventionally, as a belt-shaped electrophotographic photoconductor, there is known an endless belt shaped electrophotographic photoconductor which comprises a rectangular support film including an electroconductive layer thereon, and a photoconductive layer formed on the electroconductive layer, with the opposite end portions of the rectangular support film being connected, whereby it is worked into an endless belt shaped photoconductor.

Such a conventional endless belt shaped electrophotographic photoconductor has the shortcomings that the joint portion is cracked or a photoconductive layer portion near the joint portion is cracked or peeled off the support film in the course of repeated use of the photoconductor.

Such belt shaped electrophotographic photoconductor has another shortcoming that complete quenching of the electric charges at the joint portion cannot be carried out once the joint portion has been electrically charged at the charging step. In particular, it is difficult to discharge the joint portion at the cleaning step of cleaning the photoconductor by a quenching lamp after a toner image transfer step, so that toner is deposited on the electrically charged joint portion at the succeeding development step and a substantial amount of the deposited toner has to be removed by the cleaning apparatus in the course of the copying process, since the joint portion is not employed as image formation area, but toner remains on the joint portion. As a result, the toner deposited on the joint portion becomes a heavy load on the cleaning apparatus and causes smearing of the inside of the copying machine. Furthermore, the amount of the toner that must be recovered as waste toner increases due to the electric charging of the joint portion.

In order to eliminate the above shortcomings of the conventional belt shaped electrophotographic photoconductor, a method of forming an electroconductive overcoating layer on the joint portion has been proposed in order to electrically connect the electroconductive layer with the electroconductive layer of the photoconductor. This method is capable of preventing the accumulation of electric charges in the joint portion. However, cracking of the joint portion and the photoconductive layer near the joint portion and peeling of the photoconductive layer off the support material cannot be sufficiently prevented by the conventional electroconductive overcoating layer comprising finely-divided electroconductive particles dispersed in a resin.

SUMMARY OF THE INVENTION

It is therefore an object of the present invention to provide an endless belt shaped electrophotographic photoconductor including a joint portion, from which the conventional shortcomings, that is, (i) cracking of the joint portion and the photoconductive layer near the joint portion, (ii) peeling of the photoconductive layer near the joint portion off the support material and (iii) the accumulation of electric charges in the joint portion, have been eliminated.

According to the present invention, the above object of the present invention is attained by an endless belt shaped electrophotographic photoconductor which comprises an electroconductive support material and a photoconductive layer formed thereon, having a joint portion which comprises an electroconductive overcoating layer formed thereon, which electroconductive overcoating layer comprises a polymeric material having a glass transition temperature of $-10°$ C. or lower and finely-divided electroconductive particles dispersed in the polymeric material, or additional insertion of a joint reinforcement resin layer between the electroconductive overcoating layer and the photoconductive layer in the joint portion.

DETAILED DESCRIPTION OF THE PREFERRED EMBODIMENTS

Figure 1:
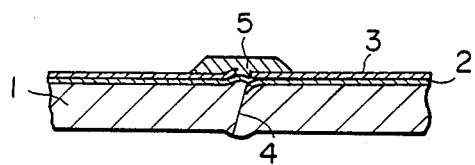
FIG. 1 is a schematic partial cross-sectional view of a joint portion of an embodiment of an endless belt shaped electrophotographic photoconductor according to the present invention.

By referring to FIG. 1, an embodiment of an endless belt shaped electrophotographic photoconductor according to the present invention will now be explained.

In the figure, reference numeral 1 indicates a support material, for instance, made of a polyester film. Reference numeral 2 indicates an electroconductive layer, for instance, made of aluminum deposited on the support material 1 by vacuum evaporation. The support material 1 and the electroconductive layer 2 constitute an electroconductive support material. Reference numeral 3 indicates a photoconductive layer comprising an organic or inorganic photoconductive material formed on the electroconductive layer 2. The photoconductive layer 3 can be formed on the electroconductive layer 2, for instance, except on the four marginal sides thereof in order to spare the areas for a joint portion and a grounding electrode. Reference numeral 4 indicates a joint portion at which the opposite ends of the electrophotographic photoconductor are connected, for instance, by an ultrasonic connecting method, by fusing the opposite ends or by use of an adhesive agent. The joint portion 4 is covered with an electroconductive overcoating layer 5.

Figure 2:
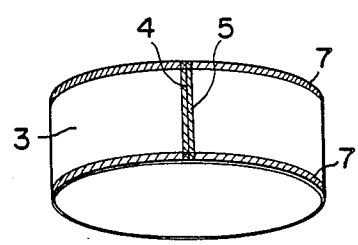
FIG. 2 is an entire perspective view of the embodiment of the endless belt shaped electrophotographic photoconductor.

The electrophotographic photoconductor can include grounding electrode portions 7 as shown in FIG. 2, which are electrically connected with the electroconductive overcoating layer 5. As such grounding electrodes, any electrode can be employed if it is electrically connected with the electroconductive overcoating layer 5.

The overcoating electroconductive layer 5 can be formed by coating along the joint portion 4 a dispersion of a polymeric material having a glass transition temperature of −10° C. or lower, an appropriate solvent for dissolving the polymeric material and finely-divided electroconductive particles, such as particles of carbon black, graphite, copper, silver or nickel, and drying the coated dispersion. The electroconductive overcoating layer 5 can also be formed by applying a fused mixture of such a polymeric material and the electroconductive particles to the joint portion 4.

As the polymeric material for use in the overcoating electroconductive layer 5, the following resin, copolymers and adhesive agents can be preferably used, provided that the glass transition temperature thereof is −10° C. or lower: a polyester resin, an acrylic resin, a methacrylic resin, a styrene resin, a styrene-acrylate copolymer, a styrene-methacrylate copolymer, polycarbonate or polyurethane, a two-liquid mixing type epoxy resin, a two-liquid type urethane resin, an one-liquid type epoxy resin, a one-liquid type urethane resin, a cyanoacrylate resin, and an ultraviolet-setting type resin. Specific examples of a commercially available polymeric material having a glass transition temperature of −10° C. or lower are polyester resins which are commercially available under the trade marks of Aronmelt PES-111, PES-120, PES-120H and PES-110H from Toagosei Chemical Industry Co., Ltd.

By use of such resins, copolymers and adhesive agents, the cracking of the joint portion and the photoconductive layer near the joint portion and the peeling of the photoconductive layer off the support material can be advantageously avoided even if the photoconductor is repeatedly employed or employed at low temperatures.

The above polymeric materials having a glass transition temperature of −10° C. or lower can be used individually or in combination with other conventional binder agents, such as acrylic resin, methacrylic resin, polyvinyl butyral, vinyl chloride-vinyl acetate resin, polyester resin, polyurethane resin, styrene resin and polycarbonate. Of these binder agents, polyester resin is the most preferable for use in combination with the above polymeric materials.

When the above binder agents are employed in combination with the polymeric materials having a glass transition temperature of −10° C. or lower are employed, it is preferable that the amount of the polymeric material be 50 wt. % or more in the entire weight of the binder agents contained in the electroconductive overcoating layer 5.

As the finely-divided electroconductive particles in the electroconductive overcoating layer 5, finely-divided particles of carbon black, graphite, copper, silver and nickel can be employed as previously mentioned.

As a matter of course, such finely-divided electroconductive particles should be contained in the electroconductive overcoating layer 5 in such an amount that toner particles do not deposit on the electroconductive overcoating layer 5.

In the present invention, the electroconductive overcoating layer 5 can be formed on the photoconductive layer 3, for example, as follows:

The above-mentioned polymeric material having a glass transition temperature of −10° C. or lower is dissolved in an appropriate solvent such as tetrahydrofuran or methylene chloride, if necessary, together with other binder agents, so that a polymeric solution is prepared. To this polymeric solution, finely-divided electroconductive particles are added to prepare an electroconductive overcoating layer formation dispersion.

The thus prepared electroconductive overcoating layer formation dispersion is applied to the photoconductive layer 3 along the joint portion 1, whereby an electroconductive overcoating layer 5 is formed along the joint portion 1 as shown in FIG. 1.

As the grounding electrodes 7, a pair of marginal portions where no photoconductive layer is formed can be used, or the grounding electrodes 7 can be formed by applying the electroconductive overcoating layer formation dispersion to the portions for the grounding electrodes 7 in the same manner as mentioned above. However as mentioned previously, as such grounding electrodes, any electrode can be employed if it is electrically connected with the electroconductive overcoating layer 5.

Figure 3:
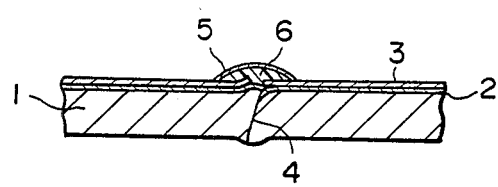
FIG. 3 is a schematic partial cross-sectional view of a modified joint portion of another embodiment of an endless belt shaped electrophotographic photoconductor according to the present invention.

For reinforcement of the joint portion 1, a reinforcement resin layer 6 can be formed along the joint portion 1 in such a configuration that the reinforcement resin layer 6 is inserted between the photoconductive layer 3 and the electroconductive overcoating layer 5 as shown in FIG. 3.

It is preferable that the reinforcement resin layer 6 be made of the same polymeric material as that employed in the electroconductive overcoating layer 5 for avoiding the cracking of the joint portion and the photoconductive layer near the joint portion, and the peeling of the photoconductive layer off the support material at low temperatures.

Other conventional resins, copolymers and adhesive agents can, of course, be used for the reinforcement resin layer 6.

The joint reinforcement resin layer 6 can be formed as shown in FIG. 3 by dissolving a resin, copolymer or adhesive agent in an appropriate solvent to prepare a solution, applying the solution to the joint portion 1 so as to cover the joint portion 1 and drying the same.

The joint reinforcement resin layer 6 can also be formed by applying a fused hot-melt type adhesive agent to the joint portion 1. Furthermore, it can be made by applying a narrow band-shaped polymeric film or metal foil coated with a pressure-sensitive or thermosensitive adhesive agent to the joint portion 1.

When an adhesive-resin-coated metal foil is employed as the joint reinforcement resin layer 6, the metal foil portion can be utilized as the electroconductive overcoating layer 5.

By referring to the following examples, the present invention will now be explained specifically:

EXAMPLE 1

An organic photoconductive layer was formed on a rectangular aluminum-deposited polyester film, except on the four marginal sides of the polyester film. The opposite shorter ends of the aluminum-deposited polyester film were fused and connected to each other by an ultrasonic connection method, so that an endless belt shaped electrophotographic photoconductor was prepared.

An electroconductive overcoating layer formation dispersion was prepared by dispersing the following components in a ball mill:

| | Parts by Weight |
|---|---|
| Polyester resin having a glass transition temperature of −10° C. or lower (commercially available under the trade mark of Aronmelt PES-111 from Toagosei Chemical Industry Co., Ltd.) | 12 |
| Graphite | 4 |
| Carbon black | 4 |
| Tetrahydrofuran | 80 |

The above dispersion was applied to the joint portion of the above endless belt shaped photoconductor and dried, so that an electroconductive overcoating layer was formed.

The other two longer marginal portions of the belt shaped photoconductor where the deposited aluminum was exposed were utilized as grounding electrodes.

Thus, an endless belt shaped electrophotographic photoconductor No. 1 according to the present invention was prepared.

A 6 cm×5 mm test sample of the enless belt shaped electrophotographic photoconductor No. 1, including part of the joint portion in such a configuration that the joint portion was present across the test sample, passing through the center of the 6 cm side, was preserved in a preservability test chamber at −10° C. for 7 days. The photoconductor was taken from the test chamber and subjected to a cracking and peeling-off test in which the photoconductor test piece was completely bent (i.e. with a bent angle of 180°) along the joint portion at 5° C. to see the cracking of the joint portion and the photoconductive layer portion near the joint portion and the peeling of the photoconductive layer off the support material.

The result was that the joint portion and the photoconductive layer portion near the joint portion did not crack at all and the photoconductive layer was not peeled off the support material.

The endless belt shaped electrophotographic photoconductor No. 1 was incorporated in a commercially available copying machine made by Ricoh Company, Ltd. and was subjected to a 50,000 copies test at a temperature of 25° C. The result was that there were observed no cracking of the joint portion and the photoconductive layer portion near the joint portion and no peeling of the photoconductive layer off the support material. Furthermore, there was no toner deposition on the joint portion of the photoconductor No. 1. Accordingly the inside of the copying machine was not smeared with the toner, and the amount of waste toner recovered was small.

EXAMPLE 2

An electroconductive overcoating layer formation dispersion was prepared by dispersing the following components in a ball mill:

| | Parts by Weight |
|---|---|
| Aronmelt PES-111 (commercially available from Toagosei Chemical Industry Co., Ltd.) | 6 |
| Polyester resin (Vylon 200 commercially available from Toyobo Co., Ltd.) | 6 |
| Graphite | 4 |
| Carbon black | 4 |
| Tetrahydrofuran | 80 |

The dispersion was applied to a joint portion of an endless belt shaped photoconductor (prepared in the same manner as in Example 1) and dried, so that an electroconductive overcoating layer was formed.

The above electroconductive overcoating layer formation dispersion was applied to the opposite longer marginal portions (as shown by the reference numeral 7 in FIG. 2) of the endless belt shaped photoconductor where no photoconductive layer was formed, but the deposited aluminum was exposed, whereby grounding electrodes were formed at the opposite longer edge portions of the photoconductor.

Thus, an endless belt shaped electrophotographic photoconductor No. 2 according to the present invention was prepared.

The thus prepared endless belt shaped electrophotographic photoconductor No. 2 was subjected to the same cracking and peeling-off test and the same copying test as in Example 1. The result was that there were no cracks in the joint portion and in the photoconductive layer portion near the joint portion, and the photoconductive layer was not peeled off the support material as in Example 1.

Furthermore, there was no toner deposition on the joint portion of the photoconductor No. 2. The inside of the copying machine was not smeared with the toner, and the amount of waste toner recovered was small.

EXAMPLE 3

Example 2 was repeated except that the grounding electrodes were formed by applying an electrode formation dispersion consisting of the following components to the opposite longer marginal portions of the endless belt shaped photoconductor, whereby an endless belt shaped electrophotographic photoconductor No. 3 according to the present invention was prepared:

| | Parts by Weight |
|---|---|
| Vinyl chloride - vinyl acetate copolymer | 6 |
| Carbon black | 4 |
| Toluene | 25 |

The thus prepared endless belt shaped electrophotographic photoconductor No. 3 was subjected to the same cracking and peeling-off test and the same copying test as in Example 1. The result was that there were no cracks in the joint portion and in the photoconductive layer portion near the joint portion, and the photoconductive layer was not peeled off the support material as in Example 1.

Furthermore, there was no toner deposition on the joint portion of the photoconductor No. 3. The inside of the copying machine was not smeared with the toner, and the amount of waste toner recovered was small.

EXAMPLE 4

An organic photoconductive layer was formed on a rectangular aluminum-deposited polyester film except on the four marginal sides thereof. The opposite shorter ends of the aluminum-deposited polyester film were fused and connected to each other by an ultrasonic connection method, so that an endless belt shaped electrophotographic photoconductor was prepared.

A solution of the following components was applied to the joint portion of the above endless belt shaped photoconductor and dried, so that a joint reinforcement resin layer was formed:

|  | Parts by Weight |
| --- | --- |
| Aronmelt PES-111 (commercially available from Toagosei Chemical Industry Co., Ltd.) | 15 |
| Tetrahydrofuran | 85 |

To the above joint reinforcement resin layer, a dispersion of the following components was applied and was then dried, so that an electroconductive overcoating layer was formed:

|  | Parts by Weight |
| --- | --- |
| Aronmelt PES-111 (commercially available from Toagosei Chemical Industry Co., Ltd.) | 12 |
| Graphite | 4 |
| Carbon black | 4 |
| Tetrahydrofuran | 80 |

In this photoconductor, the other two longer end portions were remained uncoated for use as grounding electrodes.

Thus, an endless belt shaped electrophotographic photoconductor belt No. 4 according to the present invention was prepared.

The endless belt shaped electrophotographic photoconductor No. 4 was subjected to the same cracking and peeling-off test and the same copying test as in Example 1. The result was that there were observed no cracking of the joint portion and the photoconductive layer portion near the joint portion and no peeling of the photoconductive layer off the support material as in Example 1. Furthermore, there was not toner deposition on the joint portion of the photoconductor No. 4. The inside of the copying machine was not smeared with the toner, and the amount of waste toner recovered was small.

What is claimed is:

1. An endless belt shaped electrophotographic photoconductor comprising an electroconductive support material, a photoconductive layer formed thereon, a joint portion by which said electrophotograhic photoconductor is worked into the shape of an endless belt, and a grounding electrode which is electrically connected to said electroconductive support material, said joint portion comprising (i) a joint reinforcement resin layer formed so as to cover said joint portion, said joint reinforcement resin layer comprising a polymeric material having a glass transition temperature of $-10°$ C. or less, and (ii) an electroconductive overcoating layer formed so as to cover said joint reinforcement resin layer, said electroconductive layer comprising a polymeric material having a glass transition temperature of $-10°$ C. or less and finely-divided electroconductive particles.

2. The endless belt shaped electrophotographic photoconductor as claimed in claim 1, wherein said polymeric material for said joint reinforcement resin layer and for said electroconductive overcoating layer is selected from the group consisting of polyester resin, acrylic resin, methacrylic rein, styrene resin, styrene-acrylate copolymer, styrene-methacrylate copolymer, polycarbonate, polyurethane, epoxy resin, cyanoacrylate resin, and an ultraviolet-setting resin, 3. The endless belt shaped electrophotographic photoconductor as claimed in claim 1, wherein said polymeric material for said joint reinforcement resin layer and for said electroconductive overcoating layer is selected from the group consisting of polyester resin and polyurethane.

4. The endless belt shaped electrophotographic photoconductor as claimed in claim 1, wherein said polymeric material for said joint reinforcement resin layer is polyurethane.

5. The endless belt shaped electrophotographic photoconductor as claimed in claim 1, whereing said finely-divided electroconductive particles are selected from the group consisting of carbon black particles, graphite particles, copper particles, silver particles and nickel particles.

* * * * *